United States Patent [19]

Assal et al.

[11] 4,070,637
[45] Jan. 24, 1978

[54] REDUNDANT MICROWAVE CONFIGURATION

[75] Inventors: Francois Tsvi Assal, Bethesda, Md.; Cristoph Erhardt Mahle, Washington, D.C.; Arnold Berman, Kensington, Md.

[73] Assignee: Communications Satellite Corporation, Washington, D.C.

[21] Appl. No.: 670,290

[22] Filed: Mar. 25, 1976

[51] Int. Cl.² .............................................. H01P 1/12
[52] U.S. Cl. .................................. 333/7 R; 343/853; 343/876; 343/DIG. 2
[58] Field of Search ............... 333/7 R, 7 D; 328/224; 315/153; 343/853, 854, 876; 340/147 SC, 147 T; 325/2

[56] References Cited

U.S. PATENT DOCUMENTS

| | | | |
|---|---|---|---|
| 3,537,035 | 10/1970 | Graham | 333/7 R |
| 3,600,682 | 8/1971 | Yoshimoto et al. | 333/7 R X |
| 3,827,055 | 7/1974 | Bogner et al. | 343/854 X |
| 3,953,853 | 4/1976 | Carter et al. | 333/7 R X |

*Primary Examiner*—Paul L. Gensler
*Attorney, Agent, or Firm*—Sughrue, Rothwell, Mion, Zinn and Macpeak

[57] ABSTRACT

A redundant microwave configuration providing a highly flexible routing of a plurality of inputs to a plurality of outputs is characterized by at least two switching layers wherein each switching layer comprises a plurality of four port switches and the switches in at least one of the switching layers are connected in a ring, corresponding switches in the layers being interconnected. This redundancy configuration is not limited to microwave applications only but could be implemented at all other frequencies. One microwave configuration employs 2N amplifiers between said switching layers as building blocks to provide N inputs to N antenna ports. This configuration allows any combination of (m-N) amplifier failures without loss of service, where $N \leq m \leq 2N$. In other configurations, only one type of switch is used and fewer than 2N amplifiers are used for N inputs and N outputs. Moreover, by properly choosing path lengths, the outputs of two or more amplifiers can be combined where greater power output is required than that provided by a single amplifier. In still other configuratons, the switching layers are directly connected, and one of the switching layers comprises a matrix of fast switching elements.

11 Claims, 10 Drawing Figures

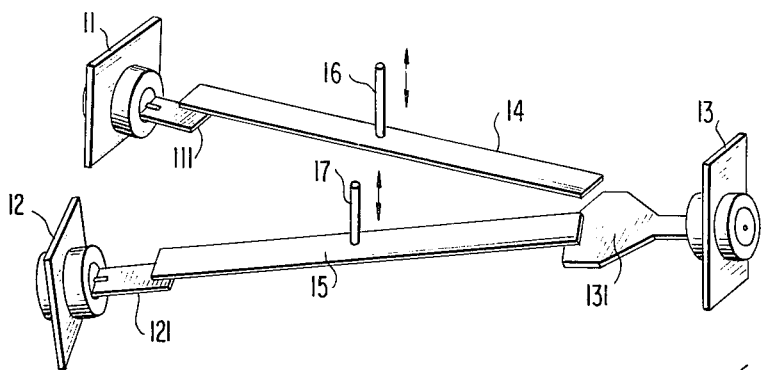
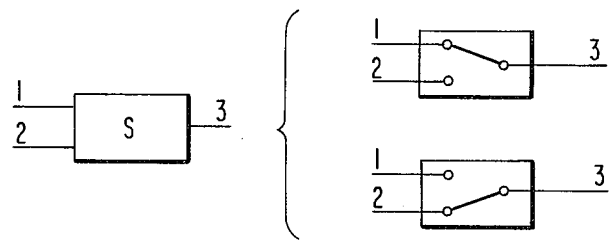
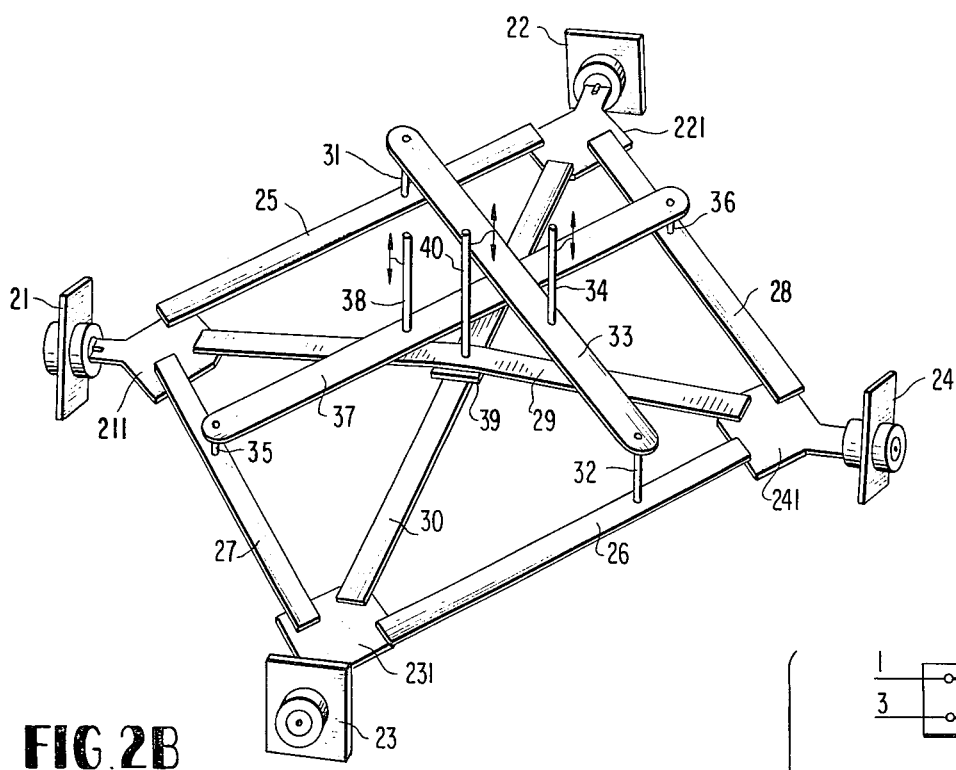
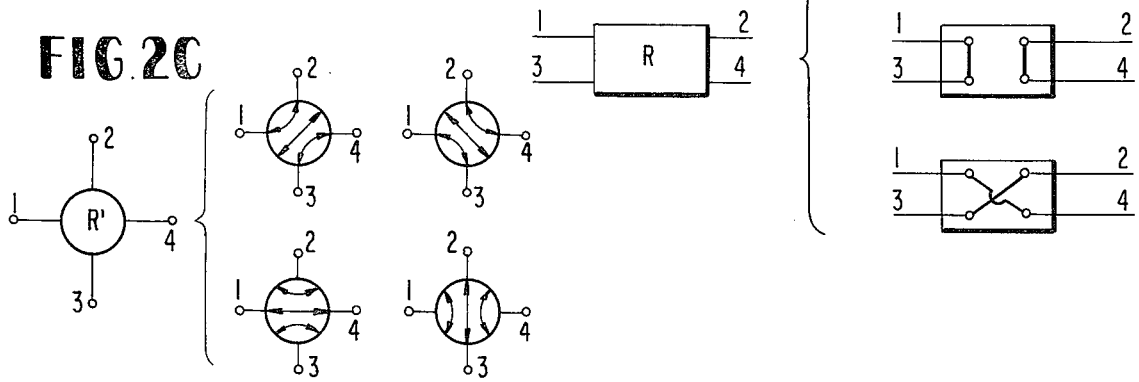
FIG.1B
FIG.1A
FIG.2B
FIG.2A
FIG.2C

4,070,637

REDUNDANT MICROWAVE CONFIGURATION

BACKGROUND OF THE INVENTION

The present invention generally relates to redundancy systems for improving reliability in communications equipment, and more particularly to a unique microwave configuration which is especially suitable for enhancing the reliability of multiple beam communications satellites.

It has been the practice to provide communications satellites with one redundant travelling wave tube (TWT) amplifier for each active amplifier in a parallel redundancy configuration. Communications satellites have been launched which have microwave configurations employing one redundant amplifier for each two active amplifiers. These satellites typically contain a relatively small number of limited bandwidth antenna beams with multiple channelized amplifiers for example, the INTELSAT IV-A per beam. In either of these configurations, a successful end of life for the communications satellite required that only three-fourths of the channels function using either the primary of redundant TWT amplifiers.

Future communications satellites will employ a large number of full bandwidth multiple antenna beams. Moreover, operational constraints placed on these satellites result in the requirement that all beams must function at the end of the life of the satellite. The net result is a requirement for approximately two orders of magnitude improvement in the reliability of the individual TWT amplifier units using presently known redundancy configurations. The possibility of achieving this kind of an improvement in the reliability of individual TWT amplifier units is remote.

SUMMARY OF THE INVENTION

It is therefore an object of the present invention to provide a unique microwave configuration that results in a higher order of redundancy to satisfy the end of life condition that all beams be functioning.

The foregoing and other objects are obtained by providing a redundant microwave configuration providing a highly flexible routing of a plurality of inputs to a plurality of outputs. The configuration is characterized by at least two switching layers wherein each switching layer comprises a plurality of four port switches and the switches in at least one of the switching layers are connected in a ring with corresponding switches in the layers being interconnected. In one specific embodiment, 2N TWT amplifiers are used as building blocks between said switching layers to provide N inputs to N antenna ports while allowing any $(m-N)$ failures in orbit, where $N \leqq m \leqq 2N$. In other words, the configuration allows any N out of 2N failures and still satisfies the end of life condition that all beams be functioning. The microwave configuration according to this embodiment of the invention employs two different types of microwave switches which allow great flexibility in connecting active amplifiers between corresponding inputs and antenna ports. In another specific embodiment of the invention, only one type of switch is used and fewer than 2N amplifiers are used for N inputs and N outputs. The invention provides an increase in reliability of several orders of magnitude for the total number of amplifiers required in orbit and results in either a considerable weight savings for comparable reliability over the conventional practice of launching satellites with either one redundant amplifier for each active amplifier or one redundant amplifier for each two active amplifiers, or several orders of magnitude increase in reliability while retaining the same weight. In addition, by properly choosing path lengths in the structure, amplifier outputs may be combined to provide power outputs per antenna beam port that are multiples of the basic TWT amplifier building block output. In still another specific embodiment of the invention, the switching layers are directly connected without intervening amplifiers, and one of the layers comprises a matrix of fast switching elements such as PIN diodes. The switches in the other layer which are connected in a ring are relatively slow speed switches that are actuated in the event of a failure of a fast switching element. The ring layer and the matrix layer can be interconnected in either order with TWT amplifiers connected to the inputs or outputs of the two switching layers.

BRIEF DESCRIPTION OF THE DRAWINGS

The specific nature of the invention, as well as other objects, aspects, uses and advantages thereof, will clearly appear from the following description and from the accompanying drawings, in which:

FIG. 1A is a block and functional diagram of a three port switch used in the invention, and FIG. 1 B is a simplified perspective view illustrating one possible mechanical configuration of the switch;

FIG. 2A is a block and functional diagram of a four port switch used in the invention, FIG. 2B is a simplified perspective view illustrating the mechanical configuration of the switch, and FIG. 2C is a modified form of the four port switch which can be used in the invention;

DESCRIPTION OF THE PREFERRED EMBODIMENTS

Figure 3A:
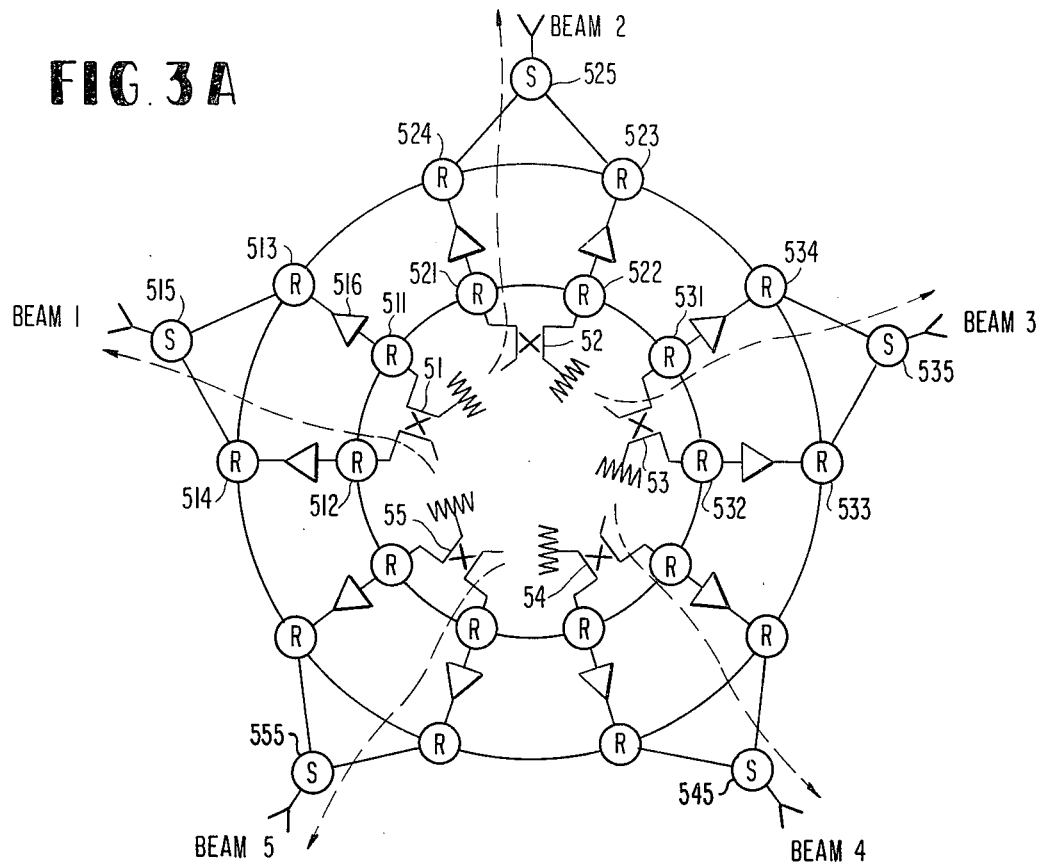
FIG. 3A illustrates one specific embodiment of the microwave configuration according to the invention having five inputs and outputs and 10 TWT amplifiers and showing the signal paths between inputs and antenna ports at the time of launch.

Before describing the microwave configuration according to the invention, it is necessary to describe specific microwave switches which make the configuration possible. One of these is illustrated functionally in FIG. 1A and is designated as an "S" switch. This switch has terminals numbered 1, 2, and 3, respectively. As is apparent from the figure, the switch is a double pole, single throw switch permitting the connection of terminal 3 to either one of the terminals 1 or 2. Such microwave switches are commercially available, but one preferred form is illustrated in FIG. 1B. The switch is a TEM stripline structure, and it will be understood by those skilled in the art that the top and bottom ground planes have been omitted for purpose of clarity. Three conventional microwave connectors, such as coaxial cable connectors 11, 12 and 13, are provided as the terminals 1,2 and 3 of the switch. The center conductors of the coaxial cable connectors 11 and 12 are electrically connected to a short piece of stripline 111 and 121, respectively, which act as electrical contact pads. In a similar manner, the center conductor of the coaxial cable connector 13 is also connected to a short stripline conductor 131 to act as a contact pad, but this contact pad is larger in area than either of the pads 111 or 121 to permit more than one electrical contact to be made. A center stripline conductor 14 extends between the contact pad 111 and 131 and overlaps each of these contact pads. A similar stripline conductor 15 extends between and overlaps the contact pads 121 and 131. Both of the stripline conductors 14 and 15 are normally biased in an upward direction by means (not shown) so that no contact is made with their corresponding contact pads. Stripline conductors 14 and 15 are provided with insulating actuating pins 16 and 17, respectively, located at approximately the mid points of the conductors. The actuating pins 16 and 17 may be connected to the armatures of solenoids (also not shown) which, when actuated, cause the corresponding stripline conductor to move downwardly to make contact with its contact pads.

The switching functions illustrated in FIG. 1A can, of course, be realized with modifications of the structure shown in FIG. 1B and even with other different types of structures. For example, the contact pad 131 could be omitted and the stripline conductors 14 and 15 could be permanently joined to the center conductor of the coaxial cable connector 13. Alternatively, a stripline circulator can be used to provide the switching functions shown in FIG. 1A. However, the switch structure illustrated in FIG. 1B is preferred because it provides the greatest isolation between the terminals.

The principal type of microwave switch desired for the microwave configurations according to the invention is functionally illustrated in FIG. 2A. This switch which is designated an "R" switch has four terminals numbered 1 to 4 and provides three toggle actions. In one position, terminal 1 is connected to terminal 2, and terminal 3 is connected to terminal 4. In another position, terminal 1 is connected to terminal 3, and terminal 2 is connected to terminal 4. In the third position, terminal 1 is connected to terminal 4, and terminal 3 is connected to terminal 2. Microwave switches which provide the first two of these three toggle positions are well known to those skilled in the art. Recently, a microwave switch which provides all three of the required toggle positions illustrated in FIG. 2A has become available commercially under the name of Microwave Matrix Switch manufactured by Lee Laboratories in Lexington, Mass. A preferred contruction of the "R" switch is illustrated, however, in FIG. 2B. As illustrated in the figure, the construction of the "R" switch, while more complex, is analogous to the construction of the "S" switch shown in FIG. 1B. Again, for purpose of clarity of illustration, the top and bottom ground planes have been omitted. Coaxial cable connectors 21 to 24 correspond to the switch terminals 1 to 4, respectively.

A stripline contact pad 211 is electrically connected to the center conductor of the coaxial cable connector 21. In a similar manner, stripline contact pads 221, 231 and 241 are electrically connected to the center conductors of the coaxial cable connectors 22, 23 and 24, respectively. A stripline conductor 25 extends between and overlaps the contact pads 211 and 221. Another stripline conductor 26 extends between and overlaps the contact pads 231 and 241. The stripline conductors 25 and 26 when brought into contact with their corresponding contact pads provide the first toggle position illustrated in FIG. 2A, i.e., terminal 1 connected to terminal 2 and terminal 3 connected to terminal 4. Stripline conductor 27 extends between and overlaps contact pads 211 and 231, and stripline conductor 28 extends between and overlaps contact pads 221 and 241. When stripline conductors 27 and 28 are made to contact their corresponding contact pads, the switch is in its second toggle position illustrated in FIG. 2A. The third toggle position illustrated in FIG. 2A is accomplished with the stripline conductors 29 and 30. Conductor 29 extends between and overlaps the diametrically opposing contact pads 211 and 241, while conductor 30 extends between and overlaps the contact pads 221 and 231.

Each of the stripline conductors 25 to 30 is biased in an upward direction so that contact with their corresponding contact pads is normally broken. It is necessary not only to selectively urge the stripline conductors into contact with their corresponding contact pads, it is also necessary to do this simultaneously in groups of two stripline conductors. This is accomplished by providing stripline conductors 25 and 26 with insulating actuating pins 31 and 32 which are like the actuating pins 16 and 17 shown in FIG. 1B. The free ends of the actuating pins 31 and 32 are joined by an actuating bar 33 which itself is provided with a single actuating pin 34. This last actuating pin 34 can be moved up and down by a solenoid armature (not shown) to cause the stripline conductor 25 and 26 to simultaneously break or make contact with their corresponding contact pads. In a similar manner, stripline conductors 27 and 28 are provided with actuating pins 35 and 36, respectively, connected by an actuating bar 37. The actuating bar 37 is provided with single actuating pin 38 which, again, may be moved by a solenoid armature. The stripline conductors 29 and 30 form a cross and are electrically insulated one from the other by a thin insulator block 39. This forms a semirigid structure which may be moved up and down by the actuating pin 40, again under the control of a solenoid armature.

A modified R switch, here referred to as an R' switch, which may be used instead of the R switch is shown in FIG. 2C. Like the R switch, the R' switch has terminals numbered 1 to 4. The switching functions are slightly different, however. In one position, terminal 1 is connected to terminal 2 and terminal 3 is connected to terminal 4. In a second position, terminal 1 is connected to terminal 3, and terminal 2 is connected to terminal 4. These switch positions correspond directly to the first and second switch positions of the R switch shown in FIG. 2A. However, the R' switch of FIG. 2C can not provide a simultaneous connection of terminal 1 to terminal 4 and terminal 2 to terminal 3. These connections are mutually exclusive as shown in FIG. 2C. This is a disadvantage of the R' switch which, under some conditions, requires more switching operations to be performed to establish redundant paths in the microwave configurations according to the invention. The advantage of the R' switch is that it is available commercially. For example, Sivers Labs in Stockholm, Sweden, make switches of this type, one such being designated as PM 7306J.

Using the "S" and "R" (or R') switches illustrated in FIGS. 1 and 2, respectively, one specific embodiment of a microwave configuration according to the invention having five inputs, five antenna ports and ten TWT amplifiers is shown in FIG. 3A to illustrate the principles of the invention. More particularly, the five inputs are connected to the configuration by means of five hybrid junctions 51 to 55. As illustrated in the figure, one input is connected to one of the inputs of its corresponding hybrid junction while the other input is terminated in the characteristic impedance of the line. In this arrangement, the hybrid junction acts as a signal splitter to split the single input between the two output ports of the junction. If as is the usual case, the satellite circuitry is itself redundant, then the second input port to the hybrid junction would be connected to the corresponding redundant circuitry rather than being terminated in the characteristic impedance of the line. With this arrangement, either the primary or the redundant circuit for any particular input may be provided at the output ports of the hybrid junction.

Each output port of each hybrid junction is connected to one terminal of a corresponding "R" switch. More specifically, the output ports of the hybrid junction 51 are connected to the switches 511 and 512, the output ports of the hybrid junction 52 are connected to the switches 521 and 522, and so forth. Each of the "R" switches connected to the output ports of the hybrid junctions are connected to form a first ring. That is, switch 511 is connected between switches 521 and 512, and switch 521 is connected between switches 522 and 511, for example.

The connection thus far described accounts for the connections to three of the four terminals of the "R" switches connected to the output ports of the hybrid junctions. The fourth terminal of each of these "R" switches is connected to a corresponding TWT amplifier. There are a total of 10 TWT amplifiers for the five inputs. The outputs of each of these TWT amplifiers are connected to respective ones of another group of "R" switches which are in turn connected to form another ring. More specifically TWT amplifier 516 is connected between "R" switches 511 and 513. "R" switch 513 is itself connected between switches 514 and 524.

The configuration is completed by five "S" switches 515, 525, 535, 545 and 555. The input terminals of switch 515 are connected respectively to "R" switches 513 and 514, while the output terminal of switch 515 is connected to the antenna port of beam 1. In a similar manner, switch 525 is connected between the antenna port for beam 2 and switches 523 and 524.

Figure 3B:
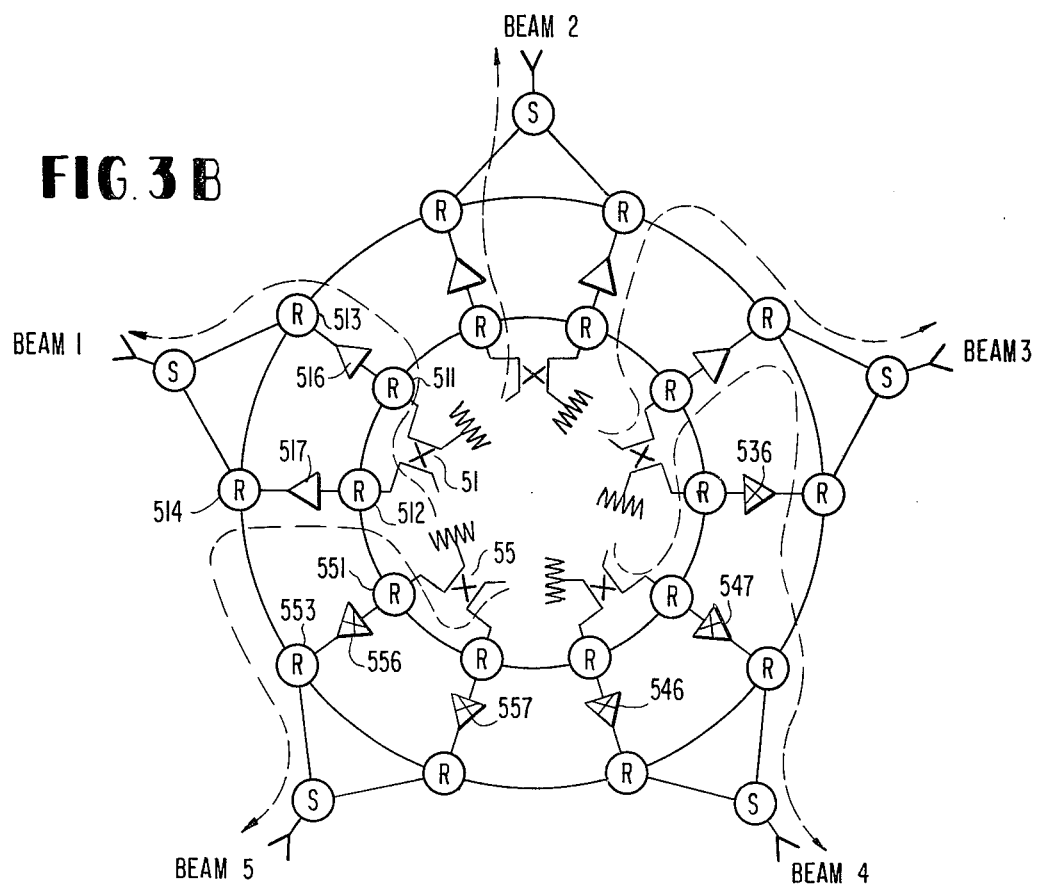
FIG. 3B shows the same microwave configuration and new signal paths between inputs and antenna ports for a worst case failure of five adjacent TWT amplifiers.

In normal operation, the primary paths indicated by the dotted line arrows provide the required interconnections to the antenna feeds from the inputs. If any one amplifier failure occurs, it is clear from the drawing that the desired interconnections are easily achieved to substitute a redundant amplifier for the failed amplifier. Also, where redundant paths are provided preceding the hybrid junctions, interconnections are clearly provided if any one failure occurs in these redundant paths. Most important, however, is the condition where as many as five (and any five) amplifier failures occur. The configuration according to the invention will still provide full interconnections between the five inputs to the corresponding five antenna ports. The worse case failure where five adjacent amplifiers have failed is illustrated in FIG. 3B. As illustrated in the figure, one of the TWT amplifiers, 536, between the third input and the third antenna port has failed, both of the amplifiers, 546 and 547, between the fourth input and the fourth antenna port have failed, and both amplifiers 556 and 557 between the fifth input and fifth antenna port have failed. Nevertheless, interconnections between corresponding inputs and antenna ports are provided by the configuration as illustrated by the dotted arrows. One thing that should be noticed about the paths illustrated in FIG. 3B is that these paths can be provided by either R or R' switches. The paths illustrated by the mapping of FIG. 3B are not unique. For example, where R switches are used, the input signal from hybrid 51 can continue to follow a path defined by R switch 512, TWT amplifier 517 and R switch 514 while the input signal from hybrid 55 can follow a path defined by R switches 551, 512 and 511, TWT amplifier 516 and R switches 513, 514 and 553. The advantage of the greater flexibility of the R switch as contrasted with the R' switch is apparent from this illustration. Specifically, no switching is required in the path followed by the input at hybrid 51 to provide a redundant path for the input at hybrid 55.

Figure 4:
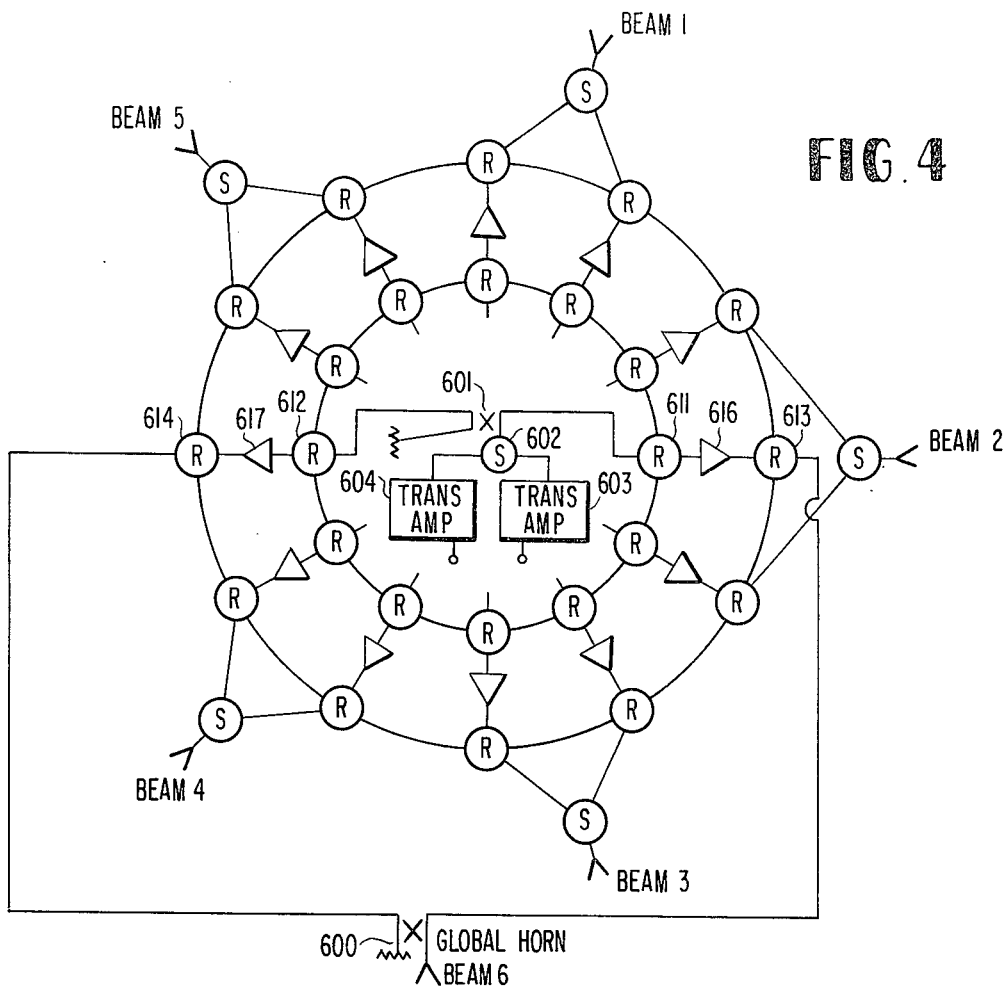
FIG. 4 illustrates a modification of embodiment shown in FIGS. 3A and 3B wherein, in addition to the five antenna ports connected to narrow beam antennas, there is provided a sixth antenna port connected to a global horn antenna and fed by two TWT amplifiers in parallel.

A modification of the embodiment shown in FIGS. 3A and 3B is illustrated in FIG. 4. The same five antennal ports are provided, and it will be understood by those skilled in the art that these five antenna ports feed narrow beam antennas. It is often desirable in communications satellites to provide a global horn antenna having a relatively wide beam. A wide beam antenna, however, requires more power than a narrow beam antenna to provide the same field strength at a given earth station within the beam widths of both antennas. The modification illustrated in FIG. 4 provides this wide beam which is designated as beam 6. The global horn antenna port for beam 6 is fed by an output port of a hybrid 600, the other output port of hybrid 600 being terminated in its characteristic impedance. The input ports of hybrid 600 are fed by R switches 613 and 614 located diametrically opposite one another in the outer ring of R switches. The locations of R switches 613 and 614 are chosen to provide equal path lengths and hence correct phasing of the parallel inputs to the global horn antenna. A TWT amplifier 616 is connected between R switches 611 and 613, and a TWT amplifier 617 is connected between R switches 612 and 614. R switches 611 and 612 are located diametrically opposite one another in the inner ring of R switches and are fed by respective output ports of a hybrid 601. An S switch 602 connects redundant transmitting amplifiers 603 and 604 to one input port of hybrid 601, the other input port being terminated in its characteristic impedance.

To provide an illustrative numerical example, it is assumed that each of the identical TWT amplifiers in the FIG. 4 configuration provides an output power of 25 watts. Under this assumption, each of beams 1 to 5 is radiated with an input power of 25 watts, and beam 6 is radiated with an input power of 50 watts.

The configuration shown in FIG. 4 provides a redundancy for beam 6 as well as for beams 1 to 5 due to the flexibility of switching provided by the inner and outer rings of R switches. It will be understood, however, that special consideration must be given to path lengths for the beam 6 antenna. For example, if amplifier 616 were to fail, not only does a redundant path have to be formed around amplifier 616, but also a redundant path around amplifier 617 has to be formed having the same path length. Amplifier 617 is then free to be used in another input to antenna port path.

Figure 5:
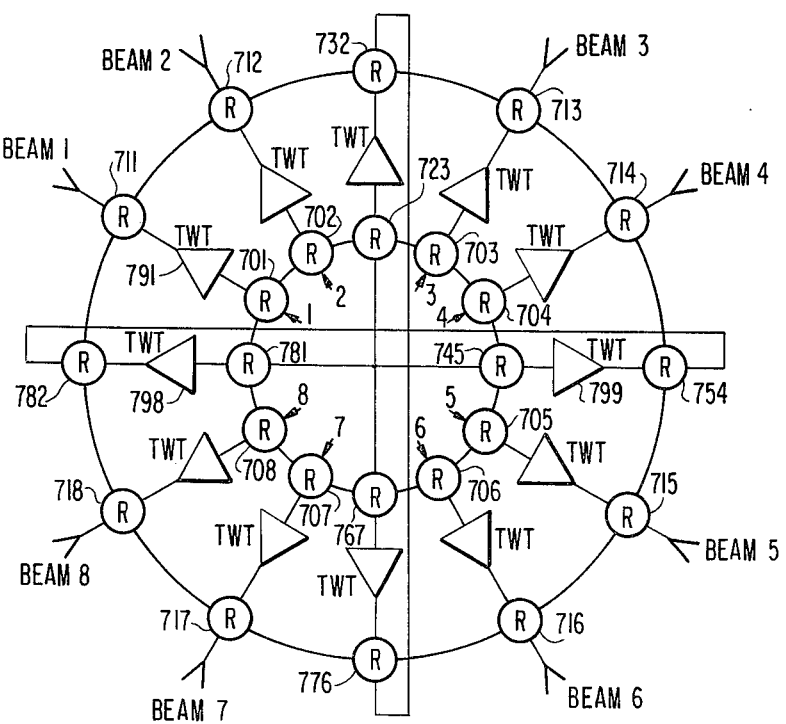
FIG. 5 illustrates another specific embodiment of the microwave configuration according to the invention having eight inputs and outputs and 12 TWT amplifiers.

Turning now to FIG. 5, another specific embodiment of the invention is illustrated where the ratio of redundant amplifiers is half that of the configuration shown in FIGS. 3A and 3B. Specifically, in this embodiment there are eight antenna beams and 12 TWT amplifiers. As in the first embodiment, there are two rings of R switches, an inner ring comprising switches 701, to 708, 723, 745, 767 and 781 and an outer ring comprising switches 711 to 718, 732, 754, 776 and 782. In the inner ring, switch 723 is connected between switches 702 and 703, switch 745 is connected between switches 704 and 705, switch 767 is connected between switches 706 and 707, and switch 781 is connected between switches 708 and 701. A similar pattern of connection exists for the switches in the outer ring.

A feature of the FIG. 5 configuration is that inputs are directly connected to corresponding inner ring R switches, and the antenna ports for each of antenna beams are directly connected to corresponding outer ring R switches. Inner ring switches 723 and 767 located diametrically opposite one another are connected together, as are switches 745 and 781. Outer ring switches 732 and 776 located diametrically opposite one another are connected to one another, as are switches 754 and 782.

In normal operation, input 1 is amplified by TWT amplifier 791 connected between switches 701 and 711. Should amplifier 791 fail, however, there are a number of redundant paths available to connect input 1 to the antenna port for beam 1. For example, input 1 could follow a path defined by R switches 701 and 781, TWT amplifier 798 and R switches 782 and 711. Alternatively, input 1 could follow a path defined by R switches 701, 781 and 745, TWT amplifier 799 and R switches 754, 782 and 711.

Figure 6:
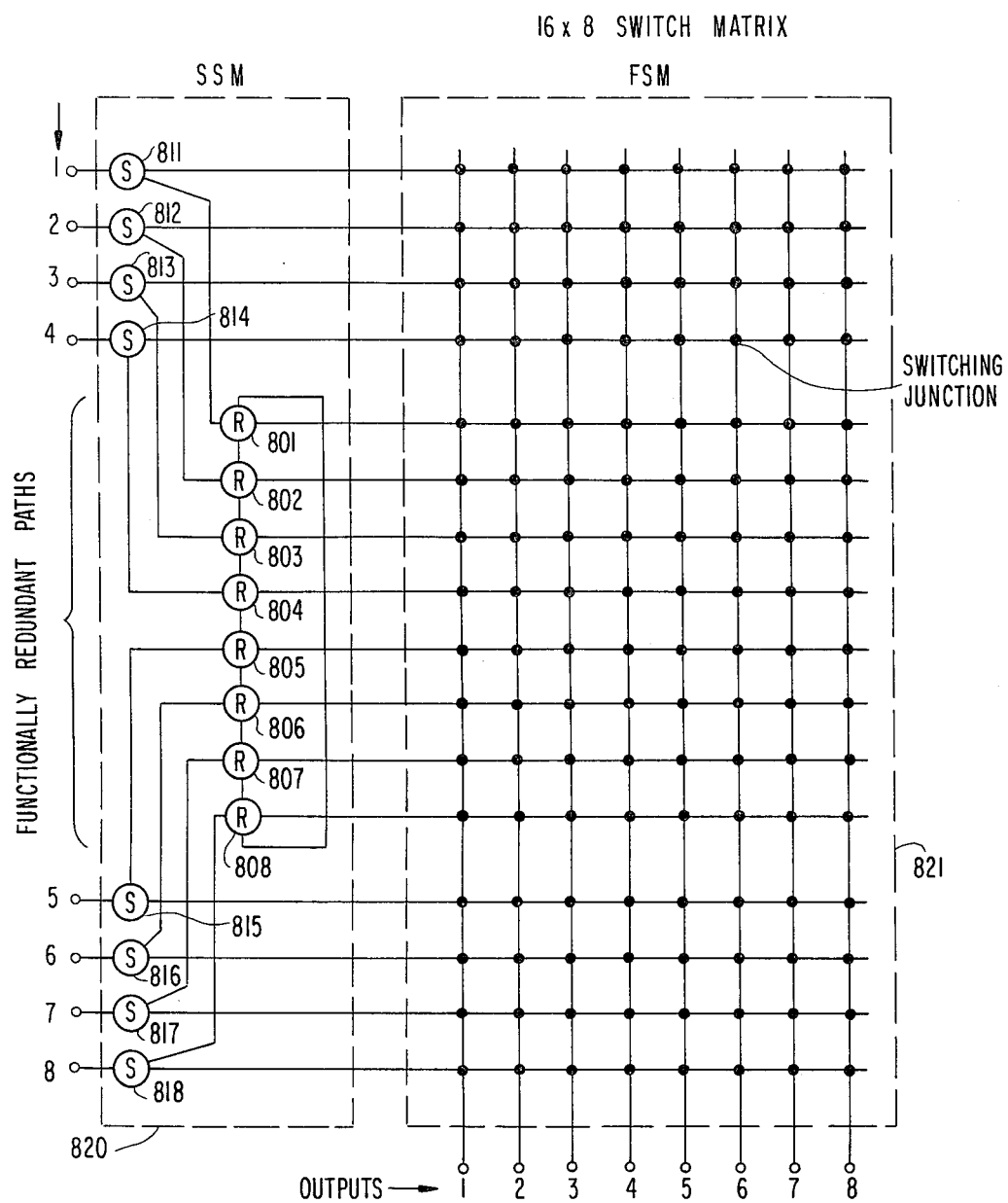
FIG. 6 illustrates still another specific embodiment of the invention in which a ring of relatively slow four port switches are interconnected with a matrix of fast switching elements.

While the embodiments disclosed thus far have the common feature of two interconnected rings of R switches, the principles of the invention may be realized in other configurations. One such configuration is illustrated in FIG. 6 and includes only one ring of R switches 801 to 808. A plurality of S switches 811 to 817 each have one terminal connected to a corresponding input and a second terminal connected to a corresponding R switch in the ring. The R switches 801 to 808 and the S switches 811 to 818 form a slow switching module (SSM) 820 having eight inputs and 16 outputs. The sixteen outputs of the SSM 820 are connected to the 16 row inputs of a fast switching module (FSM) 821 consisting of a 16 × 8 matrix of fast switching elements. As a specific example, the fast switching elements may be PIN diodes located at the switching junctions of the matrix.

The effect of the FIG. 6 configuration is to establish functionally redundant paths in the FSM 821 by means of the outputs from the ring of R switches in SSM 820. The S switches and the R switches, which are relatively slow switching elements, are operated only when a fast switching element fails.

Amplifiers may be connected to either of the inputs or outputs of the microwave configuration shown in FIG. 6 or, for purposes of redundancy, amplifiers could be connected between SSM 820 and FSM 821. But the advantages of this particular configuration can be best appreciated by considering the matrix of FSM 821 as a cross-bar switch in a telephone exchange where the primary redundancy is in the fast switching elements. Moreover, it will be appreciated by those skilled in the art that it is immaterial whether the inputs are connected to SSM 820 and the outputs to FSM 821 or vice versa.

Although the several embodiments have been described principally in terms of a communication satellite, those skilled in the art will recognize that the principles of the invention are readily adapted to earth station repeaters and the like. It will thus be apparent that the embodiments shown are only exemplary and that various modifications can be made in construction and arrangement within the scope of the invention as defined in the appended claims.

What is claimed is:

1. A redundant microwave configuration providing a highly flexible routing of a plurality of inputs to a plurality of outputs consisting of two switching layers wherein each switching layer comprises a plurality of four port switches and the switches in at least one of the switching layers are connected in a ring with corresponding switches in the two switching layers being interconnected, the switches which are connected in a ring being of the type wherein each port can be selectively and exclusively connected to each other port.

2. A redundant microwave configuration as recited in claim 1 wherein the switches in both of the switching layers are connected in rings and are of the type wherein each port can be selectively and exclusively connected to each other port.

3. A redundant microwave configuration as recited in claim 2 further comprising a plurality of amplifiers interconnecting the four port switches of one switching layer with the four port switches of the other switching layer.

4. A redundant microwave configuration as recited in claim 3 wherein said inputs are connected to selected ones of the switches in the first of said two switching layers, selected other switches in said first switching layer located diametrically opposite one another being connected together, and wherein said outputs are connected to selected ones of the switches in the second of said two switching layers, selected other switches diametrically opposite one another being connected together.

5. A redundant microwave configuration as recited in claim 3 further comprising a first hybrid junction having its output ports connected to two switches in the first of said two switching layers which are located diametrically opposite to one another, one of said inputs being connected to an input port of said first hybrid junction, and a second hybrid junction having its input ports connected to two switches in the second of said two switching layers which are located diametrically opposite to one another, one of said outputs being connected to an output port of said second hybrid junction.

6. A redundant microwave configuration as recited in claim 1 wherein the other of said switching layers is a matrix of switching junctions.

7. A microwave configuration for enchancing the reliability of multiple path communications systems having N inputs, N outputs and 2N amplifiers and allowing any $m-N$ amplifier failures where $N \leq m \leq 2N$ while maintaining full interconnections between said N inputs and corresponding ones of said N outputs, said microwave configuration comprising:

a first group of 2N switches, each having four terminals and each of said terminals being selectively and exclusively connectable to each of the other three terminals, switches of said first group being connected in pairs to respective ones of said N inputs and connected to adjacent switches to form a first ring, a second group of 2N switches identical to said first group of switches, switches of said second group being connected to adjacent switches to form a second ring, said 2N amplifiers being connected between corresponding switches in said first and second groups, and a third group of N switches, each having three terminals and one of said terminals being connected to a respective one of said N outputs and selectively connectable to each of the other two terminals, switches of said second group being connected in pairs to respective ones of switches in said third group.

8. A microwave configuration as recited in claim 7, wherein said inputs are connected to switches in said first group by hybrid junctions.

9. A microwave configuration as recited in claim 8, wherein each of said N inputs are connected to said hybrid junctions in redundant pairs.

10. A microwave configuration as recited in claim 7, wherein each of said N outputs includes an antenna.

11. A microwave configuration as recited in claim 7, wherein each of said N inputs are connected to switches in said first group in redundant pairs by hybrid junctions and each of said N outputs includes an antenna.

* * * * *

UNITED STATES PATENT AND TRADEMARK OFFICE
CERTIFICATE OF CORRECTION

PATENT NO. : 4,070,637
DATED : January 24, 1978
INVENTOR(S) : Francois Tsvi ASSAL et al It is certified that error appears in the above-identified patent and that said Letters Patent are hereby corrected as shown below:

IN THE SPECIFICATION:

Column 1, line 17 - after "amplifiers" insert -- , for example, the INTELSAT IV-A -- lines 19-20 - after "amplifiers" delete "for example, the INTELSAT IV-A"

Column 6, lines 28-29 - delete "antennal" insert -- antenna --

Signed and Sealed this

Twenty-seventh Day of June 1978

[SEAL]

Attest:

RUTH C. MASON
Attesting Officer

DONALD W. BANNER
Commissioner of Patents and Trademarks